United States Patent [19]

McMillen et al.

[11] 4,206,826
[45] Jun. 10, 1980

[54] TRANSMISSION REMOTE SHIFT SYSTEM OF THE DISCONNECT TYPE FOR A CAB-OVER CHASSIS

[75] Inventors: Russell G. McMillen; Noel E. Leitzman, both of Fort Wayne, Ind.

[73] Assignee: International Harvester Company, Chicago, Ill.

[21] Appl. No.: 962,438

[22] Filed: Nov. 20, 1978

[51] Int. Cl.² ............................................. B60K 20/04
[52] U.S. Cl. ........................... 180/77 TC; 180/89.14; 74/473 P
[58] Field of Search ............. 180/77 TC, 77 R, 89.14, 180/89.15; 74/473 P, 473 R

[56] References Cited

U.S. PATENT DOCUMENTS

| | | | |
|---|---|---|---|
| 1,485,278 | 2/1924 | Lancia | 74/473 |
| 2,250,820 | 7/1941 | Backus | 74/473 |
| 2,255,643 | 9/1941 | Beimer | 74/473 |
| 3,390,734 | 7/1968 | Sheerin | 180/77 TC |
| 3,417,634 | 12/1968 | Dangauthier | 74/473 |
| 4,073,199 | 2/1978 | Simons | 74/473 R |

FOREIGN PATENT DOCUMENTS 2264121 7/1973 Fed. Rep. of Germany ........ 180/89.14
2600065 10/1976 Fed. Rep. of Germany ........ 180/89.14

Primary Examiner—John P. Silverstrim
Attorney, Agent, or Firm—Raymond E. Parks; Frederick J. Krubel; F. David AuBuchon

[57] ABSTRACT

A break-away gear shifting mechanism, for use in a motor truck having a tilt cab, wherein a gear shift lever mounted inside the cab uncouples from a telescopic gear shift control shaft, which is supported at one end on the underside of the cab and is supported at the opposite end on the gear shifting mechanism, and telescopes outwardly or expands upon the tilting of the cab about a forward pivot axis; and reengages with the control shaft upon the pivoting of the cab back to an upright operating position simultaneously with the control telescoping inwardly or retracting to its original length.

5 Claims, 5 Drawing Figures

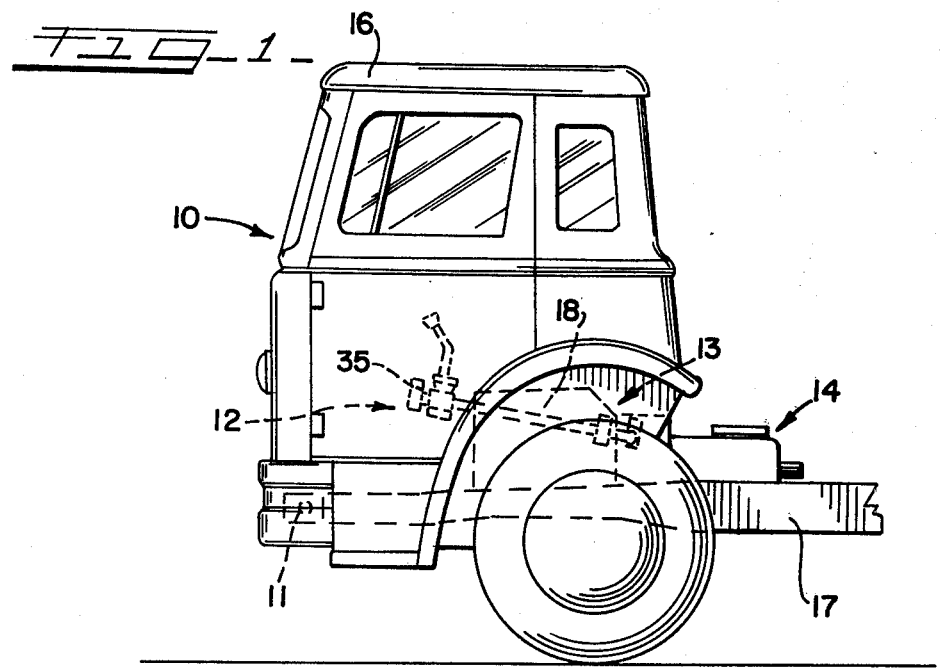
FIG-1-
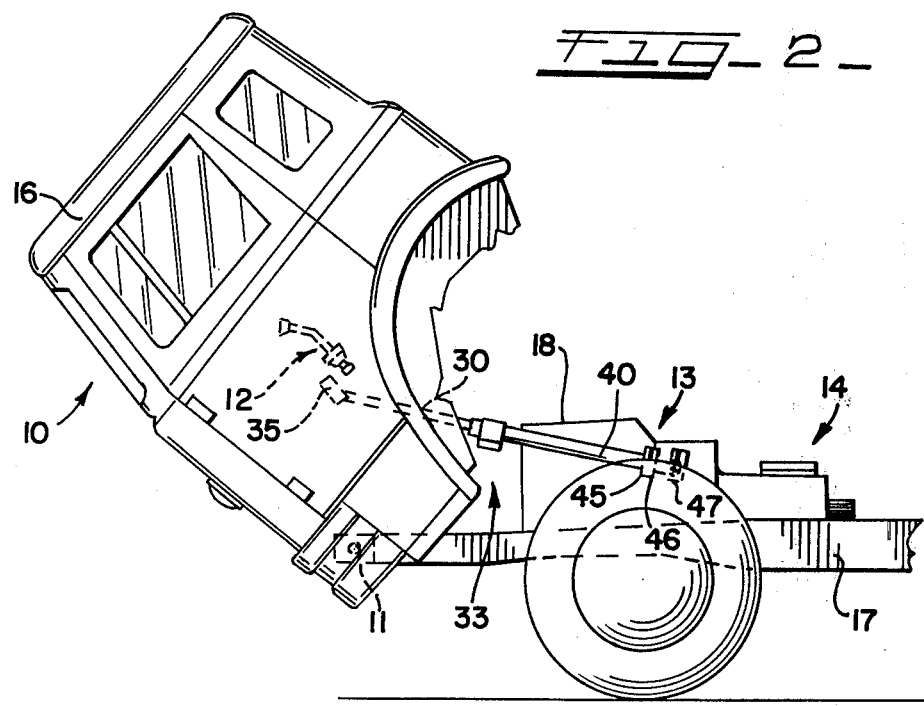
FIG-2-

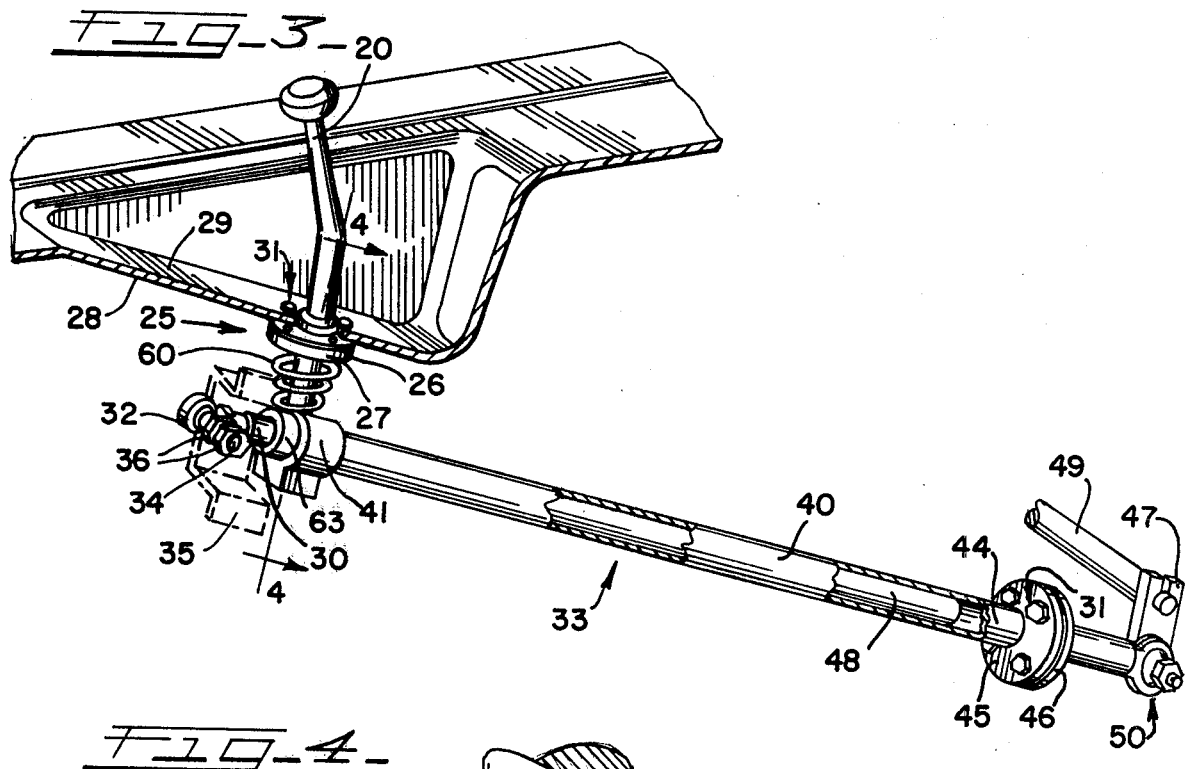

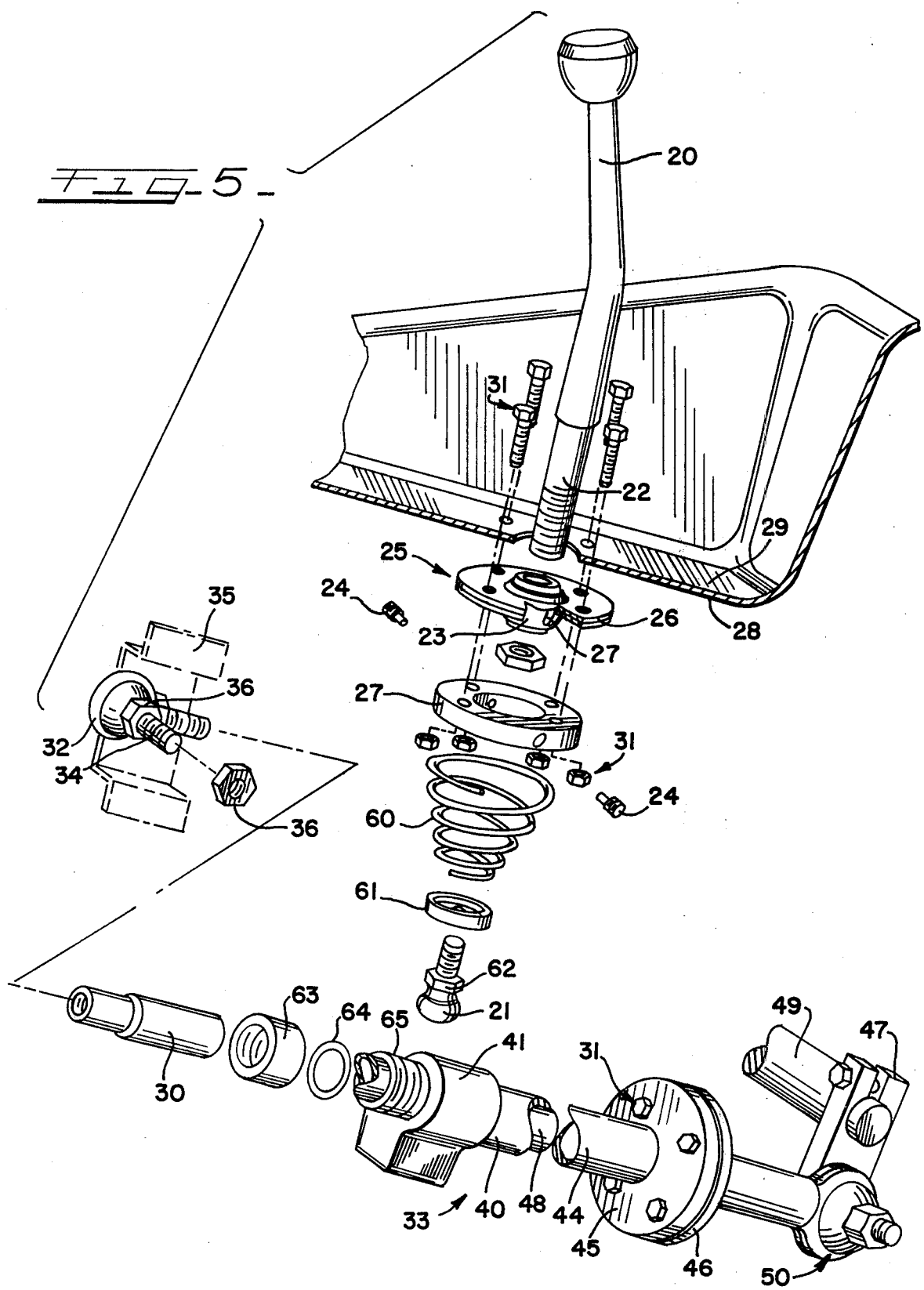

TRANSMISSION REMOTE SHIFT SYSTEM OF THE DISCONNECT TYPE FOR A CAB-OVER CHASSIS

CROSS-REFERENCE TO A RELATED APPLICATION

This patent application is a companion to a Russell G. McMillen and Noel E. Leitzman patent application entitled TRANSMISSION REMOTE SHIFT SYSTEM FOR A CAB-OVER CHASSIS, which is being filed concurrent with this patent application, under Ser. No. 962,439.

BACKGROUND OF THE INVENTION

This invention relates to a break-away gear shift assembly for use in a motor truck having a tilt cab or cab-over chassis. More particularly it relates to a gear shift lever, which is mounted to the floor of the cab and breaks away or uncouples from a gear shifting control shaft or rod upon the tilting of the cab about a forward pivot axis. The invention further concerns the gear shifting control shaft or rod, in particular a two piece telescopic gear shifting control shaft or rod, one piece of which is supported on the underside of the cab and telescopes outwardly from the second piece simultaneously with the gear shift lever uncoupling from the second piece of control rod which is supported on the gear shifting mechanism. Still further, the invention concerns the coupling or reengagement of the gear shift lever to the control rod and the telescoping inwardly or retraction of the control rod to the original length simultaneously upon the pivoting of the cab back to an upright operating position.

FIELD OF THE INVENTION

In the early forms of trucks, the cab was placed back of the engine in about the same manner as in automobiles; that is to say, substantially over the transmission located in the rear of the engine. In order to give more room for the truck body, later designs of trucks moved the cab forward over the engine. This has brought about some complication in the gear shift arrangement. In particular with the gear shift lever, which is mounted to the floor of the tilt cab, and with the gear shifting control lever or rod which extends underneath the cab to the transmission and must be supported at opposite ends thereof by bearing and universal joint means. In Applicants' copending patent application a solution is disclosed for the gear shift lever problem by providing a control rod which is supported at one end on the underside of the cab in a socket and at the other end on the gear shifting mechanism. The present invention provides a solution for the problem by providing a telescopic control shaft, or rod, the one end of which is supported by the underside of the cab telescopes outwardly from the second end, and where the gear shift lever simultaneously is disconnected from the second end of the control rod to permit access to the engine when the cab is tilted about a forward pivot axis.

DESCRIPTION OF THE PRIOR ART

United States Pat. No. 3,390,734—Sheerin—July 2, 1968 shows a telescopic throttle control linkage which expands with the tilting of the motor truck cab. Since this linkage only transmits linear motion, it does not solve the problem associated with a gear shifting control rod which in addition transmits rotational motion.

In U.S. Pat. No. 1,485,278—Lancia—Feb. 26, 1924 there is shown a depending ball ended gear shift lever which engages in an upwardly opening socket carried in an axially and angularly moveable gear shifting control shaft or rod, which is supported at opposite ends on the chassis. See also U.S. Pat. No. 3,417,634—Dangauthier—Dec. 24, 1968.

In U.S. Pat. No. 2,255,643—Beimer—Sept. 9, 1971 there is shown a depending ball ended gear shift lever that is detachably secured to a socket carried on the engine. A gear shifting control rod is pivotally connected at one end to the gear shift lever above the depending ball end and at the other end to the transmission.

In U.S. Pat. No. 4,073,199—Simons—Feb. 14, 1978, a two piece gear shift lever is provided which jack-knifes to permit the upper portion to clear an opening in the cab floor as the cab is tilted forward.

In U.S. Pat. No. 2,250,820—Backus—July 29, 1971 a transfer case is mounted above the engine and a gear shift lever having a depending ball end extends into a socket in the transfer case.

None of the aforementioned prior art United States patents provides any solution to the problem of disconnecting the gear shift lever from the control rod, and the telescoping outwardly or extending of a cab supported end of a telescopic control rod upon the tilting of the cab about a forward pivot axis and the reconnection of the lever to the rod simultaneously with the rod telescoping inwardly or contracting upon the return of the cab to a normal upright operating position.

SUMMARY OF THE INVENTION

There is provided a gear shift lever having a depending ball end which is anchored intermediate its ends by a universal connection to the floor of the tilt cab. A ball carried on the gear shift lever, which comprises a part of the universal connection, is slotted 20 degrees above and below the central ball axis with an anchor pin therein preventing the rotation of the ball and permitting the gear shift lever to move laterally as well as fore-and-aft. The slotted ball on the gear shift lever is supported in a bearing housing attached to the floor of the tilt cab and comprises another part of the universal connection. The ball end of the gear shift lever depends from the bearing ring below the floor of the tilt cab. An axially and angularly moveable two piece telescopic gear shifting control rod or shaft has one shaft end that is pivotally mounted to the underside of the cab. The other end of the first piece is telescoped within the second piece of the shaft and the terminal end of the second piece is pivotally connected to a gear shift transmission means. A coupling means is provided at the connection of the control rod end to the shift transmission means to adjust the effective length thereof. A funnel shaped upright socket means is provided on the second piece of the control rod which engages or couples with the depending ball on the end of the gear shift lever. As the tilt cab is pivoted about a forward axis, the ball ended stub shaft on the depending end of the gear shift lever disengages from the upright funnel shaped socket on the second piece of the control rod and simultaneously the first piece of the control rod slides or telescopes outwardly from the second piece and follows the tilting cab. The length of the first piece is sufficiently long to prevent it from pulling out of the second piece. As the tilt cab is pivoted back to an upright operating position, the expanded control rod contracts and the funnel shaped socket on the "in place" second piece of control rod engages with the ball ended stub shaft on the depending end of the gear shift lever simultaneously with the axially telescopically moveable first piece of the control rod sliding inwardly into the in place second piece of the control rod. A conical spring is provided on the depending end of the gear shift lever between the universal bearing housing and the ball ended stub shaft which maintains the gear shift lever in a neutral position, i.e. prevents it from flopping around when the cab is tilted and aligns the ball with the socket when the cab is pivoted back, and then holds the ball in place in the socket, i.e. prevents it from rattling in the socket when the cab is in the upright operating position. When the gear shift system is engaged, the gear shift lever, when selecting rail positions in the transmission, causes the upright funnel shaped socket on the second piece of the telescopic control rod to rotate about the longitudinal axis of the first piece. A remote shift housing is associated with the transmission and is provided with a universal connection which provides a pivotal axis for the control rod at that end thereof. The gear shift lever when shifting into or out of gear also causes the funnel shaped socket on the second piece of the control rod to travel in a forward and rearward direction parallel to the centerline or longitudinal axis of the control rod, with the second piece of the control rod sliding or telescoping over the first piece, which is now the "in place" member, thereby operating the universal connection carried on the remote shift housing. The remote shift housing in consequence of the movement of the gear shift lever reacts and produces a gear engagement. All the forces in the gear shift lever system are resisted by the chassis mounted remote shift housing or through the cab itself as a result of the gear shift lever and the first piece of the control rod being anchored to the cab.

As the cab is tilted about the forward pivot axis, the first piece of the cab end-connected control rod pulls outwardly from the second piece of the remote shift housing end-connected control rod, simultaneously with the ball on the gear shift lever disengaging with the socket on the "in place" second piece of the control rod, and the conical spring urges the gear shift lever to maintain a neutral position. When the cab is lowered, the first piece of the control rod telescopes within the second piece, and the depending ball ended gear shift lever contacts and engages with the upright funnel shaped socket on the second piece of the control rod, and the gear shift lever completes its engagement onto the control rod simultaneously with the first piece of the control shaft completing its inward travel. In the event where it is necessary to tilt the cab a full ninety degrees, additional telescopic tubes can be added to effect a longer extension of the control rod. No seal is required for the gear shift lever because it is attached directly to the cab which is an advantage because in tilting the cab for servicing the engine, there are no seals to part or move and thereby leak. Simplicity of the system also effects a substantial weight savings and cost savings.

BRIEF DESCRIPTION OF THE DRAWINGS

FIG. 1 shows a motor truck, chassis and a tilt cab in an upright position with a gear shift lever and gear shifting control rod in an engaged condition and connected to a remote shift housing;

FIG. 2 shows the same cab tilted about a forward pivot axis with the gear shift lever disengaged from the gear shifting control rod and the gear shifting control rod expanded;

FIG. 3 is a partial detail of the gear shift system with portions of the cab broken away;

FIG. 4 is an enlarged cross-sectional view through lines 4—4 of FIG. 3 showing the engagement of the ball ended gear shift lever in the funnel shaped socket on the gear shifting control rod and the universal connection of the gear shift lever to the tilt cab; and FIG. 5 is an exploded parts view of the FIG. 3 detail.

DESCRIPTION OF THE PREFERRED EMBODIMENT

In order that the invention may be readily understood and put into practical effect, reference will now be made to FIGS. 1 and 2 of the drawings wherein 10 represents a cab-over chassis type of motor truck, 11 represents the forward pivot point of the tilt cab 16, 12 represents the portion of the gear shift lever assembly which is carried in the tilt cab 16, 13 represents the portion of the gear shift assembly which is carried on the chassis of the motor truck 10, and 14 represents a remote shift housing assembly carried on the chassis 17 of the vehicle 10.

With reference now to FIGS. 3, 4 and 5 there is shown a gear shift lever 20 which is provided with a ball ended stub shaft 21 on the lower end 22. A universal ball and socket connection 25 supports or floats the gear shift lever 20 in a flanged socket and bearing carrier 26 which is supported in a bearing and socket carrier housing means 27. The ball 23 of the universal connection 25 is provided with slots 20° above and below the central axis of the ball 23. A pair of anchor pins 24 prevent rotation of the ball 23 about the axis of the gear shift lever 20 and permit a side-to-side movement of the gear shift lever 20 as well as a fore-and-aft movement. The bearing and socket carrier housing 27 is mounted to the underside 28 of the cab floor 29. No seal or boot is required over the universal connection 25 since the carrier 26 and housing 27 are mounted as a unit to the underside 28 of floor 29 of the cab 16 by bolts and nuts 31. The cab end supported portion 30 of the telescopic gear shifting control rod 33 carries a spherical rod end 32 which is connected by a screw 34 and nuts 36 to a depending flange or bracket 35 (attached to the underside of the cab.) A conical spring 60 is compressed between the carrier housing 27 and a dished circular flange member 61 carried by a crown portion 62 on the ball end 21. All of the aforementioned elements comprise the portion of the gear shift lever assembly 12 which is carried on the tiltable cab structure 10.

We will now describe the elements which comprise the portion of the gear shifting assembly 13 carried on the chassis 17.

The chassis or transmission end supported portion 40 of the gear shifting control rod 33 carries a pot bracket 41 which has a funnel shaped opening 43 for leading the ball end 21 of the lever 20 into the cylindrical or straight bore 37 in the pot bracket 41. The pot bracket 41 is rigidly attached to the steel tube 40, which has a controlled inside diameter to slip fit the telescoping inside steel tube 30. An end cap 63 holds a lip seal or O-ring 64 over the first tube 30 and is screwed onto the threaded end 63 of the second tube 40. The remote end 44 of the second control rod portion 40 is connected to a coupling half 45 which in turn is connected to a second coupling half 46 which is universally mounted at 50 to a rock arm 47 of the remote shaft housing assembly 14. It is obvious that the second control rod portion 40 can slide in a fore-and-aft axial direction over the first control rod portion 30 and rotate about the cylindrical bearing surface 48 of the first control rod portion 30 and swing about the universal connection 50, thereby pushing or pulling the rocker shaft 49 in a transverse direction to the longitudinal axis of the control rod 33; and that the effective length of the control rod 33 can be adjusted by shims inbetween the coupling halves 45–46.

BRIEF DESCRIPTION OF THE OPERATION

When it becomes necessary to service the engine 18 of the vehicle 10, the cab 16 is tilted, from the upright position in FIG. 1, forward about the axis 11, to the inclined position shown in FIG. 2. The depending ball end 21 of the gear shift lever 20 disengages from the funnel holed pot bracket 41 on the second control rod portion 40 and simultaneously the conical spring 60 expands against the dish flange 61 and hold the lever 20 in place and the control rod 30 slides or telescopes outwardly from the second portion 40. When the cab 16 is pivoted back from the tilted position shown in FIG. 2 to the upright position shown in FIG. 1, the first portion 30 of the control rod 33 telescopes inwardly or contracts into the second portion 40 and the depending ball 21 on lever 20 comes into contact with the ramped surface 43 of the right conoid shaped guide opening 49 in the pot bracket 41 and is piloted downwards and sideways until the ball 21 starts to seek and enter the cylindrical hole 37. The dish flange 61 contacts the pot flange 41 and exerts a downward pressure on the crown 62 of the ball 21 to complete the engagement in the cylindrical bearing hole 37.

Where a full ninety degree cab tilt is required, the tilt geometry will require a longer extension length for the control rod 33 than the normal system extension length. In this event an additional tube can be added within the inner tube 30 to effect greater extension.

What is claimed is:

1. A break-away gear shift lever assembly for use in combination with a motor truck tilt cab, the tilt cab pivotally mounted along a forward transverse axes to a motor truck chassis, the gear shift lever assembly including a gear shift lever having a depending end, a ball-ended stub shaft mounted to the depending end, an angularly movable elongated telescopic control rod having an inner tube sleeved into an outer tube, the inner tube pivotally end connected to the tilt cab and the outer tube pivotally end connected to a gear shift transmission means, and a pot bracket mounted to one of the telescopic control rod tubes, the pot bracket having a funnel shaped hole converging downwardly into a cylindrical bearing hole, the cylindrical bearing hole accommodating the ball-ended stub shaft in the non-tilted position of the tilt cab, wherein the improvement comprises:

a conical compression spring sleeved over the ball-ended stub shaft and having a depending end engaging a flange on the ball-ended stub shaft and an upright end engaging the tilt cab maintaining the gear shift lever in a neutral position upon tilting of the tilt cab concurrent with the disengagement of the ball-ended stub shaft from the pot bracket.

2. A break-away gear shift lever assembly according to claim 1, wherein the flange comprises a cup having an apertured bottom sleeved over the ball-ended stub shaft, including means for connecting the bottom of the cup to the ball-ended stub shaft, and wherein the depending end of the conical compression spring is nested in the cup.

3. A break-away gear shift lever assembly according to claim 2, wherein the conical compression spring converges downwardly into the cup.

4. A break-away gear shift lever assembly according to claim 2, wherein the gear shift lever is supported in a universal spherical joint housing mounted to the tilt cab, and wherein the conical compression spring flares outwardly and upwardly from the cup and engages the housing.

5. A break-away gear shift lever assembly according to claim 2, wherein the pot bracket is mounted to the outer tube and the bottom of the cup abuts a rim around the funnel shaped hole in the pot bracket in the non-tilted position of the tilt cab.

* * * * *